United States Patent [19]

Zamora

[11] Patent Number: 5,113,342
[45] Date of Patent: May 12, 1992

[54] COMPUTER METHOD FOR EXECUTING TRANSFORMATION RULES

[75] Inventor: Antonio Zamora, Chevy Chase, Md.

[73] Assignee: International Business Machines Corporation, Armonk, N.Y.

[21] Appl. No.: 344,344

[22] Filed: Apr. 26, 1989

[51] Int. Cl.⁵ ............................................ G06F 15/21
[52] U.S. Cl. .................................................. 364/419
[58] Field of Search ........................ 364/419, 200, 900

[56] References Cited

U.S. PATENT DOCUMENTS

| | | |
|---|---|---|
| 4,028,677 | 6/1977 | Rosenbaum . |
| 4,092,729 | 5/1978 | Rosenbaum . |
| 4,456,969 | 6/1984 | Herzik et al. . |
| 4,574,363 | 3/1986 | Carlgren et al. . |

OTHER PUBLICATIONS

Hayes, G. P., "Computer Architecture and Organization," McGraw-Hill Co., N.Y., pp. 4-6.
Griswold et al., "The SNOBOL4 Programming Language", Prentice-Hall, Inc., Englewood Cliffs, N.J., pp. 1-75, 1970.
Woods, W. A. "Transition Network Grammars for Natural Language Analysis", *Communications of the ACM*, vol. 13, No. 10, pp. 591-606 (1970).
Lesk, M. E. et al., "Lex—A Lexical Analyzer Generator Analysis," Computer Science Technical Reports, 39, Bell Lab., Murray Hill N.J., Oct. 1975.
Elovitz, H. S. et al., "Letter-to-Sound Rules for Auto. Trans. of Eng. Text to Phonetics", *IEEE*, vol. 24, No. 6, Dec. 1976, pp. 446-458.
Manas, J. A., "Word Division in Spanish", *Comm. of the ACM*, vol. 30, No. 7, pp. 612-616, Jul. 1987.
Brodda, B. et al., "An Experiment with Automatic Morphological Analysis of Finnish", Dept. of Linguistics, Univ. of Hel., No. 7, 1981.
Carlgreen et al., "Minimum Redundancy Hyphenation Data Storage Technique", IBM Tech. Discl., Apr. 1984, pp. 6109-6109.
Moore, M. S. et al., "Editor-Inserted Soft Hyphenation", IBM Tech Disc., Jun. 1986, pp. 383-384.

*Primary Examiner*—Gail O. Hayes
*Attorney, Agent, or Firm*—John E. Hoel

[57] ABSTRACT

A computer method is disclosed for using rewrite rules of the form X(Y)Z=(R) where X is the left context, Y is the body of the rule, Z is the right context and R is the replacement value for Y if the rule is successful. The method places restrictions on how the rules are defined to make it possible to organize the rules so that they can be indexed efficiently. In particular, the body of the rules is not allowed to be defined in generic terms, whereas this restriction is not applied to the left and right context of the rules. The rules are scanned so that the first rule that matches the body and its context is the one that applies. Ordering the rules into a hierarchy makes it possible to have exceptions to any particular rule. The method encompasses a model where the rules are applied to any input string. When no rules apply to any character of the input string, a default rule to copy the string is applied. This guarantees that the process will always terminate and that it will be loop-free.

8 Claims, 1 Drawing Sheet

COMPUTER METHOD FOR EXECUTING TRANSFORMATION RULES

BACKGROUND OF THE INVENTION

1. Technical Field

The invention disclosed broadly relates to computer methods and more particular relates to a computer method to interpret rules to transform an input string into an output string.

2. Background Art

A "rewrite mechanism" is a process that applies transformations or rewrite rules to an input string to transform it into a new string. Although the idea seems very simple on the surface, there are complications which make it necessary to define resolution of ambiguities and guarantee termination. These problems may be appreciated through some examples. Suppose that we have the rewrite rules 1) a→x
2) b→y.

The rules are interpreted to mean that every time the character on the left occurs in a string which is being transformed, it is replaced by the character on the right side of the arrow. These rules will convert the string "abba" into "xyyx" by simple substitution. However, if we add an additional rule which replaces "ab" with "z,"

3) ab→z, then we have the following ambiguity: if rule 1 applies before rule 3, "abba" gets transformed into "xyyx," but if rule 3 has a higher priority than rule 1, then "abba" becomes "zyx."

An additional problem that is encountered in rewrite rule system is determining whether a set of transformation rules will terminate when executed. In other words, are the rules defined in such a way that the process will terminate? The next example illustrates the problem. If we define a rule to transform "yy" into "z"

3) yy→z, the string "abba" is first transformed into the string "xyyx" through the application of rules 1 and 2, then this string is converted into "xzx" since its middle two characters are "yy." This repetitive application of the rules is called recursion. A set of non-terminating rules can be created by defining a rule such as 3) xy→ab.

The string "abba" is first transformed into "xyyx" by rules 1 and 2 but rule 3 transforms it into "abyx." Rules 1 and 2 apply again and "abyx" is transformed back into "xyyx." The process repeats idefinitely without terminating.

It is the purpose of this invention to define a rewrite mechanism which solves the problems of rule ambiguity, priority and termination. It is a further object of the invention to define a way of organizing rules that results in efficient execution for a wide variety of applications.

3. Prior Art

M. E. Lesk, et al., "LEX—a Lexical Analyzer Generator," *Comput. Sci. Tech. Rep.*, 39, Bell Laboratories, Murray Hill, N.J. October 1975. This article describes a pattern matching program where the patterns are associated with program statements which perform actions when the patterns are matched. LEX is not a complete language; it operates in association with a host compiler.

J. A. Manas, "Word Division in Spanish," *Communications of the ACM*, Vol. 30, No. 7, pp. 612-616, July 1987. This article describes the application of LEX as a rewrite mechanism to hyphenate Spanish text.

B. Brodda, et al., "An Experiment with Automatic Morphological Analysis of Finnish," Department of Linguistics, University of Helsinki, Publ. No. 7, 1981. This article describes the "BETA system"—a finite-state automaton which has string replacement capability. The system has a queueing mechanism to resolve multiple rules that could apply to a specific input string. The format of the rules is table-oriented and there is no provision to prevent infinite loops.

J. P. Hayes, "Computer Architecture and Organization," McGraw-Hill Book Co., New York, 1978, pp. 4-6. This book for new students of computer science describes the principles of a "Turing machine" defined in 1936 by Alan Turing. This machine is basically a state automaton attached to a tape which can be used for any computation imaginable, including the application of rewrite rules.

R. E. Griswold, et al., "The SNOBOL 4 Programming Language," Prentice-Hall, Inc., Englewood Cliffs, N.J. 1970. SNOBOL 4 is a programming language that offers many string matching capabilities which are relevant to rewrite mechanisms. The strategy for matching strings is of interest because the generality of SNOBOL precludes efficient matching. Although SNOBOL is a very powerful computer language, it is notorious for executing slowly.

OBJECTS OF THE INVENTION

It therefore an object of the invention to provide a simplified mechanism for rewrite rules.

It is another object of the invention to provide a simplified mechanism for rewrite rules that makes it possible to organize the rules efficiently.

It is yet a further object of the invention to provide a simplified mechanism for rewrite rules that makes it possible to interpret the rules efficiently.

SUMMARY OF THE INVENTION

These and other objects, features and advantages are accomplished by the invention disclosed herein. The invention consists of a methodology for defining rewrite rules of the form $X(Y)Z=(R)$ where X is the left context, Y is the body of the rule, Z is the right context and R is the replacement value for Y if the rule is successful. This methodology places restrictions on how the rules are defined to make it possible to organize the rules so that they can be indexed efficiently.

In particular, the body of the rules is not allowed to be defined in generic terms, whereas this restriction is not applied to the left and right context of the rules. The rules are scanned so that the first rule that matches the body and its context is the one that applies. Ordering the rules into a hierarchy makes it possible to have exceptions to any particular rule.

Part of the methodology for this invention encompasses a model where the rules are applied to any input string to create an output string while the body of any rule that matches is skipped in the input string. When no rules apply to any character of the input string, a default rule to copy the string is applied. This guarantees that the process will always terminate and that it will be loop-free.

APPLICATIONS OF THE INVENTION

Algorithmic hyphenation: Rules for the hyphenation of words can be expressed as rewrite rules.

Speech synthesis: Text-to-speech rules can be used to drive a speech synthesizer.

Transliteration: Converting the characters of one language into another language can be accomplished through rewrite rules.

Major novelty items: Rules are organized by the body for efficient matching. Once a rule applies, the portion matching the body is skipped to avoid reprocessing and to guarantee termination. The rules apply to an input string to create an output string. Rules can be organized into a hierarchy. A default rule to copy characters for which no rules match guarantees termination.

Other items of novelty which improve efficiency: Body consists of terminal strings only. Generic symbols are only used outside the body of a rule. States can be used to provide additional flexibility. Multiple passes allowed, but controlled by the rules to guarantee termination. Notation is clear compared with other finite state systems.

BRIEF DESCRIPTION OF THE DRAWINGS

These and other objects, features and advantages of the invention will be more fully appreciated with reference to the accompany figures.

DESCRIPTION OF THE BEST MODE FOR CARRYING OUT THE INVENTION

Figure 1:
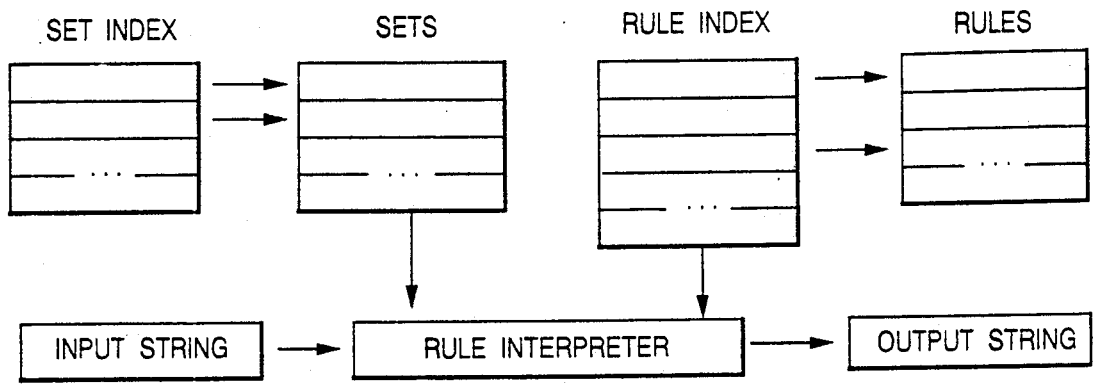
FIG. 1 is a general flow diagram of the invention.

The rewrite rule mechanism addresses the problem of transforming one string to another by application of a set of rules. Two tasks that can benefit from this approach are the hyphenation of words or the transliteration of text tokens into phonetic strings.

In the past, these problems have been addressed by dictionary lookup or by writing specialized computer programs. Dictionary lookup is inadequate because it only copes with a fixed number of cases. Computer programs, on the other hand, can apply rules to an infinite number of cases, but require specialized knowledge of computer programming in order to update the rules.

Rewrite rule mechanisms make it possible to create a set of rules that can be modified without knowledge of computer programming. However, most rewrite rule systems are quite complex in order to achieve the power of Turing machines (which theoretically can solve any computable problem). See for example: Woods, W. A., "Transition Network Grammars for Natural Language Analysis", Comm. of the ACM 13, No. 10, 591–606 (1970). These powerful systems suffer from the same defect as computer programs: It is possible to write rules which will cause the system to loop forever.

The subject invention addresses the problem of transforming one string into another, but it introduces constraints that guarantee the termination of the process. In addition, the conventions used for describing the rules make it possible to specify the sequence in which the transformations are applied and to execute the rules efficiently in a computer system.

The invention consists of a methodology for defining rewrite rules of the form X(Y)Z=(R) where X is the left context, Y is the body of the rule, Z is the right context and R is the replacement value for Y if the rule is successful. This methodology places restrictions on how the rules are defined to make it possible to organize the rules so that they can be indexed efficiently.

In particular, the body of the rules is not allowed to be defined in generic terms, whereas this restriction is not applied to the left and right context of the rules. The rules are scanned so that the first rule that matches the body and its context is the one that applies. Ordering the rules into a hierarchy makes it possible to have exceptions to any particular rule.

Part of the methodology for this invention encompasses a model where the rules are applied to any input string to create an output string while the body of any rule that matches is skipped in the input string. When no rules apply to any character of the input string, a default rule to copy the string is applied. This guarantees that the process will always terminate and that it will be loop-free.

THE USE OF THE REWRITE MECHANISM TO DEFINE HYPHENATION RULES

Requirements for algorithmic hyphenation can be expressed as rules that define character sequences, the context of the characters and the action to be performed when the components of the rule match against a word. This document describes the format of algorithmic hyphenation rules and their interpretation by the computer. The rule tables contain COMMENTS, DECLARATIONS and RULES. The file containing the hyphenation rules must consist of variable length records.

FORMAT OF COMMENTS

A comment is a line starting with an asterisk (*) in column 1. Comments may also be written on any line by preceding the comment with at least one blank and an asterisk. For example,

*The following rule removes duplicate m's (m)m=( )
*Rule to remove duplicate m's

FORMAT OF DECLARATIONS

Declarations are used to define sets of characters or strings. The identifiers of these sets can be used to reduce the number of rules to describe the hyphenation requirements. All declarations must precede the rules. The general format of a declaration is:

*DCL S=(c1 c2 c3 ...)

Where the first 5 characters are "*DCL", the "S" is a set identifier, and "c1", "c2", "c3", etc., are characters or character sequences that belong to the set enclosed in parentheses.

The set identifier "S" can be an upper-case alphabetic character or a single numeric digit. Additional sets can be defined by two-digit numbers preceded by an apostrophe (e.g., '13=(a b c)).

The characters or strings comprising the set are any non-reserved characters which are separated from each other by a single blank. Single upper-case alphabetics or numerics can be used if they are not used as set identifiers. A string may not exceed a length of 5, and there may not be more than 60 members in a set. Special conventions are used to represent accented characters.

THE FIRST PASS CARD

The first pass card defines the initial state to be used for the first pass through the input string. The card is optional; if omitted, the initial state for the first pass is zero. The format is the following:

*PASS1 IS

Where "IS" is an optional two-digit number specifying the initial state.

THE SECOND PASS CARD

A second application of the rules to the string produced by the first pass is specified by including a Second Pass card with the following format:

*PASS2 IS

Where "IS" is an optional two-digit number specifying the initial state for the second pass. The card is omitted only a single pass is made through the input string.

FORMAT OF RULES

Rules represent patterns that have to be matched against a word that is to be hyphenated. The left side of a rule is the PATTERN, and the right side represents the REPLACEMENT string. Rules have the format

X(Y)Z=(R)

where X and Z represent the left and the right CONTEXT for the string Y, respectively. The string Y is called the BODY of the rules and is enclosed in parentheses to separate it from the context. X and Z are strings consisting of zero or more non-reserved characters or Set Identifiers. The string Y consists only of non-reserved characters which must be found within a word for the rule to apply. Sets cannot be used within the body of the rule. The replacement string R is enclosed in parentheses and may contain any character or it may be null "( )".

The rules may specify states over which they are valid, and they may reset the value of the current state. The specification of states is optional. Rules with states have the format:

ES X(Y)Z=(R)NS where "ES" is a two-digit number followed by one blank which specifies the state for which the rule will be executed; this is called the EXECUTION STATE. The two-digit number "NS" preceded by one blank following the replacement string is the NEW STATE which becomes the current state after execution of the rule. Rules which do not specify an execution state are assigned ES=00. Rules which do not specify a new state do not change the value of the current state. Execution of the rules always starts with an initial state of 00. A different initial state may be specified for the optional second pass through the *PASS2 card.

States are interpreted in two ways. If the Current State is in the range 00 to 49, rules with ES=00 are executed without regard to the current state. However, if the Current State is in the range 50 to 99, no rules with ES=00 are executed, except for the default rule which consists of copying a character for which there are no rules.

An underscore character "_" used as part of the context of a rule represents a DELIMITER. When used as the first character of X or the last character of Z, it will match against the beginning or end of a word, respectively. The underscore character need not be the first or last character of the context; it will also match against internal punctuation characters in the word (as in: "can't, "mother-in-law"). The underscore will match against the following characters in addition to end-of-field:

blank - ' _ . = / ( ) "

A period "." used as part of the context of a rule will match against any character, including punctuation, but it will not match an end-of-field. The period acts as a GENERIC character or place holder. For example: _(ab)=(ab) will match "ab" when it occurs at the beginning of a word, but .(ab)=(ab) will succeed only if "ab" is preceded by a character, i.e., "a" is not the first character of the word.

Since the rules are indexed by the first character of the Y string, the rules should be grouped by the first character of the Y string. The first rule which successfully meets the conditions expressed by the XYZ pattern is the one that is used. Otherwise, the next rule in the group is examined; this is why the rules must be ordered not only by the first character of the Y string, but also in decreasing priority order. When all the rules applicable to a word have been examined or when a word has a character for which there are no rules, the character is copied as if there had been rule (Y)=(Y) where Y is the character in question.

Input strings are scanned from left to right while a search is made for rules that match. When the pattern of a rule matches successfully, the portion of the input string corresponding to Y is skipped, and an output string R is concatenated to any previous output string. The output string may be different from the matched Y string, e.g., (ck)=(k-k).

Rules may be viewed as examining an input string and generating a new output string. A rule such as "X(abc)Z=(jkl)" means: When "abc" matches against an input string and the left context is "X" and the right context is "Z", add the string "jkl" to the output string and skip "abc" in the input string. In other words, replace "abc" with "jkl". If the body of the rule is the same as the replacement, e.g., "(abc)=(abc)" this means: add the string "abc" to the output string and skip it in the input string. In other words, just copy "abc".

When the BODY of a rule (the section within parenthesis on the left side of the equal sign) has matched against the input string, the input characters corresponding to the body are skipped. Then, the replacement side of the rule, i.e., the characters within parentheses on the right side, is added to the output string. The replacement does not affect the match whatsoever because the match is performed only on the input string.

Due to the interaction of the rules, it is not possible to say that a rule like "(abc)=(abc)" will not allow hyphenation of "abcde" to get "abc-de". This will happen if there is another rule "(d)=(-d)". However, we can block this by preceding this rule with another one line "abc(d)=(d)".

RESERVED CHARACTERS

The following punctuation characters are reserved for describing the rules; other punctuation characters may be reserved to input special characters.

13 . ( ) = * '

Accented characters can be coded in accordance with the conventions illustrated in Appendix A.

EFFICIENCY, SEQUENCE AND INTERDEPENDENCE

When defining a set, it is more efficient to list its members in decreasing frequency of occurrence. In this way a match is discovered sooner than if the members are listed in any other sequence.

A dot "." representing a generic character matches more efficiently than a set.

Single characters strings in a set are scanned before longer strings. Since the pattern matching stops as soon as a condition is satisfied, it does not make sense to include in a set any character strings starting with the same character as a single-character member of the set.

For example, given a rule "(ad)X_=(+)" where X=(c ch), the input string "radc" would generate "r+c" whereas the string "radch" would be unchanged because the rule is not satisfied. That is, the "c" in the input string "radch" matches a member of the set X, but the following input character "h" does not match the delimiter "_" specified by the rule.

A hyphenation rule like "(algebra)=(al-geb-ra)" would be more efficient if written as "a(lgebra)=(l-geb-ra)" or as "al(gebra)=(-geb-ra)" or even "alge(b-r)a=(b-r)" depending on which other rules are included. The reason for the improved efficiency is that the letters "l", "g" or "b" occur less frequently than the letter "a". If the letter "a" already has many rules, it is more efficient to create rules which are indexed under another letter because fewer rules are scanned and they are scanned more rarely (depending on the frequency of the letter indexed).

It is not useful to define sets with one member. The declaration "*DCL T=(t)" and the rule "(uloso)T-=(ulos-o)" could be simply written as "(uloso)t=(ulos-o)". Sometimes, rules involving small sets can be fully listed to reduce the number of sets used. If the set is small, its expansion results in very few extra rules. Reference to a set requires more time than matching a character in a rule.

A hyphenation rule such as "(akvaar)V=(-ak-vaa-r)" should probably be coded as ". . . (akvaar)V=(-ak-vaa-r)" since a hyphen is never desired as the first character or after the first character of a word.

The program hyphenates according to the first rule that applies. This is why "exceptions" must always be listed ahead of the generic rules. Thus, if "br" is never hyphenated as "b-r" except in the word "algebra", the rule for the exception must precede the generic rule "(br)=(br)".

If a rule containing a generic character (e.g., "(aio).-=(ai-o)") precedes a rule with a specific character (e.g., "(aioi)=(ai-oi)") the rule with the specific character will never be matched. In these examples, the dot "." of the first rule will match against the letter "i" or any other letter; therefore, the second rule never matches. This same problem may occur when the rules reference sets.

There are some "side-effects" related to the sequence of scanning the words. Since the scan of a word is performed from left to right, once a letter which is in the body of a rule has been matched, it is skipped in the input and cannot be affected by the replacement portion of other rules. For example, given the word "tomato" and the following two hyphenation rules: "(tomat)=-(to-mat)" and "(mat)=(ma-t)", only the first rule will match. The reason for this is that once the string "tomat" in the first rule has been matched and replaced by "to-mat", the scan continues from the REMAINING UNMATCHED portion of the input word, i.e., "o". If no other rules apply, the default rule (o)=(o) will be used to copy the remaining letter giving "to-mato". If the rules are written as: "(to)mat=(to-)" and "(mat)=(ma-t)" the word will be hyphenated as "to-ma-to" because both rules will match. When the sequence "mat" is in the CONTEXT rather than in the BODY of the first rule, it does not block the application of the second rule.

It is not possible to have a set within the body of a rule. There are two reasons for this: a) the corresponding replacement on the right side has to be specific and b) the rules are indexed based on the first character within the parenthesis for run-time efficiency.

There is no provision for having a set which is the complement (or negation) of another set. One problem that arises here is that the complement of a set of vowels, for example, is not only the remaining alphabetics, but also the rest of the 256 characters in the code page. This can pose problems for words with special punctuation such as "mother-in-law", "O'Korn", etc.

QUESTIONS AND ANSWERS

Q: What is the exact definition for the priority of the rules. The primary criterion seems to be scanning the word from left to right: (kalle) overrides (alle) because (k) is processed first?

A: Once the BODY of a rule (the section within parenthesis on the left side of the equal sign) has matched, it is not available for further replacements, although it may be referenced in the context of a rule that applies later.

The input word is scanned left to right character-by-character. Given the word "skallen" and the rules (kalle)=(xyz) and (alle)=(f) you get the following result:

there is no rule for "s"; therefore, the "s" is output.

when the "k" is scanned, the string "kalle" matches and "xyz" is output.—the scan continues from the next letter (the "n") for which there are no rules, so it is output.

the result is "sxyzn".

The rule for "alle" can only apply if the first rule is changed to "(k)alle=(xyz)"; in this case the result is "sxyzfn".

Q: When would you use states in the rules?

A: States can be useful when it is necessary to link the actions of two rules. Suppose that it is necessary to change the ending "ing" to "ings" for words having a prefix "sub" (e.g., substring→substrings). The rules to accomplish this would be:

_(sub)=(sub) 03

03 (ing)_=(ings)

The first rule recognizes the prefix "sub" and sets the current state to 03. The second rule executes ONLY when the current state is 03; therefore, it would not execute for a word such as "ring".

Q: How do you suppress double hyphens? The two hyphenation rules (esi)=(esi-) and (k)V=(-k) generate "esi—kot."

A: Double hyphens can be avoided by having only hyphenation rules that have hyphens on the left of the replacement string, i.e., rule=(-xx), OR they can be avoided by having only rules with hyphens on the right of the replacement string, i.e., rule=(xx-). When you mix rules with hyphens on both sides, you will get double hyphens when the two rules apply in sequence.

Another way of avoiding double hyphens is by requesting a second pass which removes them. This can be done with the statements:

*PASS2 50

50 (-)-=( )

The *PASS2 card specifies an initial state of 50 for the second pass. The rule to remove adjacent hyphens applies only when the current state is 50. It is necessary to use a state higher than 49 to prevent execution of rules for which no Execution State is specified, i.e., ES=00.

Q: How should the rules be ordered, for example hyphenation rules?

A: The hyphenation process has to be thought of using a concept of RULES and EXCEPTIONS. If we have a basic rule "... (s)V=(-s)" that hyphenates before "s" followed by a vowel, the rule will be preceded by exception rules that suppress hyphenation. Preceding these exception rules there will be exceptions to the exceptions, and so on. An exception to a rule MUST BE MORE SPECIFIC than the rule it is intended to override AND it must specify a DIFFERENT replacement string. That means that the body and the context of the exception rule contain all (or equivalent) elements PLUS some additional restrictions AND an opposite action. This is illustrated by the following example:

| RULE | EXPLANATION |
| --- | --- |
| _.V(s)VCV.=(-s) | A2a. Exception to rule A2 hyphenates |
| .V(s)VCV._=(-s) | A2b. Exception to rule A2 hyphenates |
| .V(s)VCV.=(s) | A2. Exception to rule A suppresses hyphenation |
| _.VNV(s)V.=(-s) | A1a. Exception to rule A1 hyphenates |
| .VNV(s)V._=(-s) | A1b. Exception to rule A1 hyphenates |
| .VNV(s)V.=(s) | A1. Exception to rule A suppresses hyphenation |
| ..(s)V=(-s) | A. Basic rule hyphenates |

Although the order of rules that have the same function (e.g., A1a and A1b, above) does not matter, it is preferable to order them alphabetically by the body (in parentheses) and then by right and left context.

Q: How can hyphens before the first character of a word be suppressed? E.g., "-pro-jek-ti"

A: Leading hyphens can be avoided by coding hyphenation rules that specify a generic "." character as part of the left context. For example, the rule "(proj)V=(-pro-j)" could be specified as ". . . (proj)V=(-pro-j)". The two generic characters insure that there are at least two characters in front of the string "proj". This will avoid the leading hyphen problem and also a single letter followed by a hyphen.

DEBUGGING

Sometimes it is desirable to explain why a word is hyphenated in a particular way. This is difficult to determine manually when the number of rules is large. For this reason, a hyphenation program may have a dynamic debugging facility. In the debugging mode, the program will show the rules that matched. This debugging mode is enabled by typing the string "ddt=1" when the program requests an input word.

Debugging mode is disabled by typing "ddt=0".

| Example: | INPUT WORD ... | |
| --- | --- | --- |
| | ddt=1 | ==> enable debug mode |
| | INPUT WORD ... | |
| | extremadamente | |
| | MATCH !..(t)LV! | |
| | MATCH !F(r)! | |
| | MATCH !..(m)V! | |
| | MATCH !..(d)V! | |
| | MATCH !..(m)V! | |
| | MATCH !..(t)V! | |
| | ex-tre-ma-da-men-te | |
| | INPUT WORD ... | |
| | ddt=0 | ==> disable debug mode |
| | INPUT WORD ... | |
| | extremadamente | |
| | ex-tre-ma-da-men-te | |

Examples of the application of the invention.

Application of the Invention to Rules for Phonetic Mapping

Using the English phonetic rules in Appendix B and given the input word "nation", each input character is examined. The first "n" is copied to the output string since there are no rules for "n". The rules for "a" require (ai) or (au), but since these conditions are not satisfied, the "a" is appended to the output string. Examining the "t", the input string "tion" matches the right context of the rule "s(t)ion=(t)", but since there is no "s" to the left of the input string, the rule fails. The next rule examined is "(t)ion=(sh)" and it succeeds, thus appending "sh" to the output string. The remaining characters of the input string "i", "o" and "n" do not have any rules that apply and are copied in turn to the output string. When the input string has been exhausted, the interpretation of the rules has generated the output string "nashion" from the input string "nation".

By a similar process, the word "phonetic" is transformed into "fonetik" when the rules "(ph)=(f)" and "(c)=(k)" are applied. If, instead, the set of rules consisted of "(n)e=(-n)" and "(i)c=(-i)", the word "phonetic" would be transformed into "pho-net-ic", thus accomplishing a hyphenation function rather than a phonetic transformation function.

Preferred Embodiment and Pseudocode of the Rewrite Rule Interpreter

The Rule Interpreter applies rule tables to an input string to generate a transformed output string, as shown in the general flow diagram of FIG. 1. This output string may be processed with the same rule tables in subsequent passes by using the output of one pass as input for the next pass.

For increased efficiency, indices are built for the sets and for the rules. Thus, the rule tables consist of a Set Index, a Rule Index, Sets of strings, Rewrite Rules, and global variables containing the initial state to be used for each pass. The Rewrite Rules are of the format

ES X(Y)Z=(R)NS where "ES" is the Execution State, "X" is the left context, "Y" is the body of the rule, "Z" is the right context, "R" is the replacement string, and "NS" is the New State.

Given an input_word, multiple passes are done as follows:

```
wordin = input_word
call rule_int(wordin,pass1_initial_value, wordout)
if pass2_initial_value != -1 (
  wordin = wordout
  call rule_int(wordin,pass2_initial_value,wordout)
  if pass3_initial_value != -1 (
    wordin = wordout
    call rule_int(wordin,pass3_initial_value,wordout)
    if pass4_initial_value != -1 (
      wordin = wordout
      call rule_int(wordin,pass2_initial_value,wordout)
    )
  )
)
output_word = wordout
```

Figure 2:
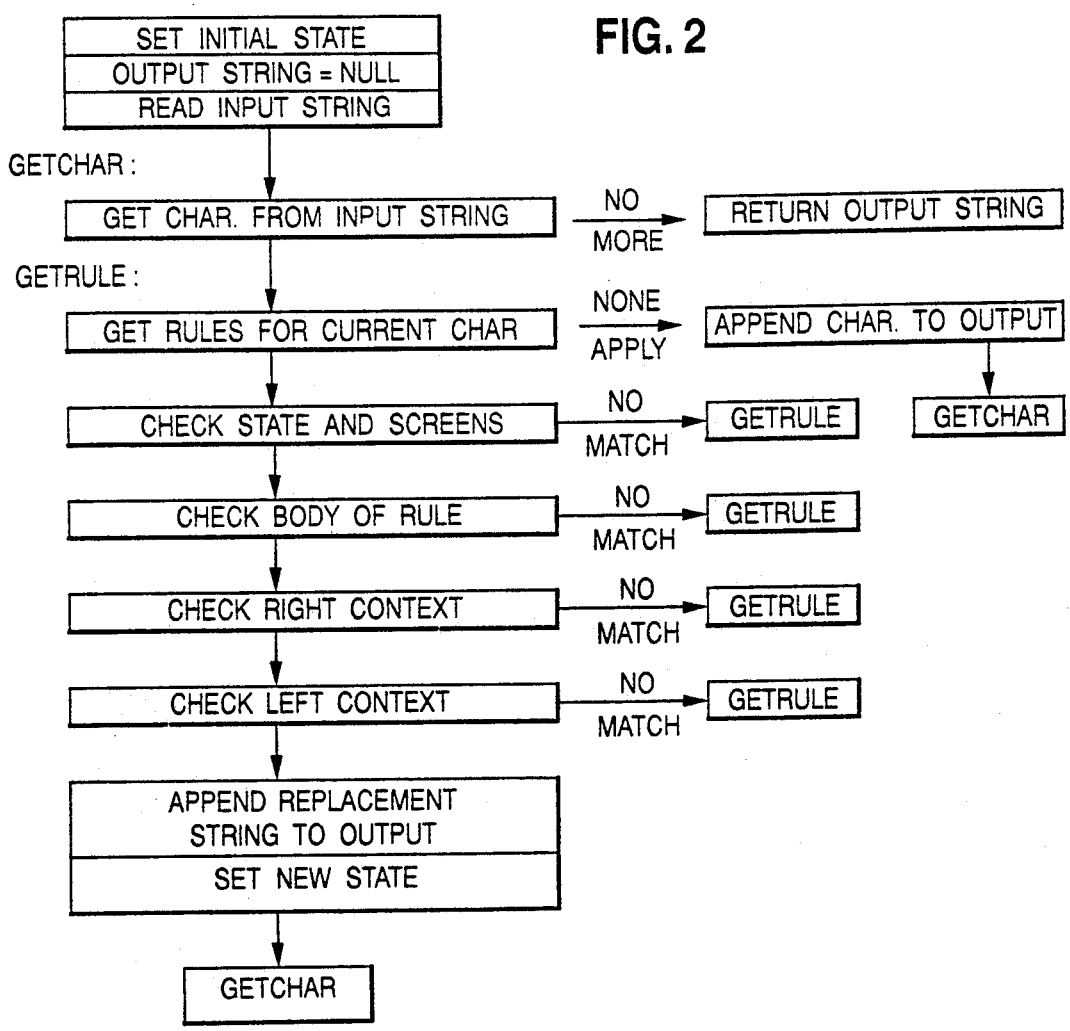
FIG. 2 is a flow diagram of the rule interpreter feature of the invention.

The Rule Interpreter itself, as shown in the flow diagram of FIG. 2, works as follows:

```
rule_int:
  Set State to parameter value passed.
```

-continued

```
    Initialize output string to null.
char_scan:
    For each character of the input string.
    search the character in the rule index.
    When input string is exhausted, return output string.
    If the character is not indexed, copy it to the output
    string,
    skip the character in the input string and continue
    char_scan.
    Examine in sequential order all rules for the character.
    Using the rule index locate the appropriate rule and
    at this point ES, NS, X, Y, Z and R refer to the current
    rule.
apply_rule:
    If State < 50 then
        if ES > 0 and ES != State then skip_this_rule.
    If State >= 50 then
        if ES != State then skip_this_rule.
    Apply length screens to make sure that the rule can
    apply.
    If the input string is smaller than required by the rule,
    skip_this_rule.
    If Y does job match the input string, skip_this_rule.
right_context:
    For each character of Z,
    If the character is a set indicator (
    get set number.
    If the input string is exhausted (
        if a null-string is in the set, continue scan of
        right_context,
        otherwise, skip_this_rule.
    )
    Check multiple-character and single-character set
    members in decreasing length order.
    If a set member matches, skip corresponding portion
    of input string and continue scan of right_context.
    If null-string set member is present continue scan of
    right_context,
    otherwise skip_this_rule.
    )
    otherwise, If the character is a terminator "?" (
        If the input string is exhausted scan left_context.
        otherwise skip_this_rule.
    )
    otherwise, If the character is a delimiter "_" (
        If the input string is exhausted scan left_context.
        If current input character is not punctuation skip
        this rule.
        Skip input character and continue scan of
        right_context.
```

-continued

```
    )
    otherwise, If the character is a generic character "." (
        If the input string is exhausted skip_this_rule.
        Skip input character and continue scan of
        right_context.
    )
    otherwise, (
        If the input string is exhausted skip_this_rule.
        If the input character does not match the rule
        character
        skip_this_rule.
        Skip input character and continue scan of
        right_context.
    )
left_context:
    The left_context scan procedure is identical to the
    right_context procedure, but the direction of scanning
    is right-to-left instead of left-to-right. Also,
    left_context should be substituted in every place
    where right_context is mentioned, and a match_condition
    is recognized at the point where the process would
    continue to scan the left_context.
match_condition:
    Concatenate the replacement string to the output string.
    Skip the portion of the input string corresponding to
    Y (the body of the rule that matched).
    Set State to NS.
    Continue char_scan.
skip_this_rule:
    Skip the current rule.
    Get the next rule.
    If another rule is available (
    Set ES, NS, X, Y, Z and R.
    Continue to apply_rule.
    )
    If no more rules are available, copy current character
    to the output string,
    skip the character in the input string and continue
    char_scan.
```

Appendix A shows an example of Spanish hyphenation rules and Appendix B shows an example of English text-to-sound transformation rules, in accordance with the invention.

The resulting invention provides a simplified mechanism for rewrite rules that makes it possible to organize and interpret the rules efficiently.

APPENDIX A
Spanish Hyphenation Rules

```
*   Based on rules given by Jose A. Manas, Comm ACM, July 1987,
*   Vol. 30, No. 7

*       Vowels
*DCL V=(a e i o u /a /e /i /o /u :u)
*       Open and accented vowels
*DCL A=(a e o /a /e /i /o /u)
*       Closed vowels
*DCL I=(i u :u)
*       Front Consonants
*DCL F=(b c d f g k p t)
*       Liquid consonants
*DCL L=(l r)
*       Doubles
*DCL D=(ch ll rr)
```

```
* Vowel rules
.A(a).=(-a)
.A(e).=(-e)
.A(o).=(-o)
.A(/a).=(-/a)
.A(/e).=(-/e)
.A(/i).=(-/i)
.A(/o).=(-/o)
.A(/u).=(-/u)

*Consonant rules
..(b)LV=(-b)
..(b)V=(-b)

..(ch)V=(-ch)
..(c)LV=(-c)
..(c)V=(-c)

..(d)rV=(-d)    *this rule works in conjuncton with an "r" rule
..(d)V=(-d)

..(f)LV=(-f)
..(f)V=(-f)

..(g)LV=(-g)
..(g)V=(-g)

.I(h)I=(h)
.A(h)I=(h)
.I(h)A=(h)
.c(h)=(h)
..(h)V=(-h)

..(j)V=(-j)

..(k)LV=(-k)
..(k)V=(-k)

..(ll)V=(-ll)
l(l)=(l)
.d(l)V=(-l)
F(l)=(l)
..(l)V=(-l)

..(m)V=(-m)
..(n)V=(-n)
..(°n)V=(-°n)
..(p)LV=(-p)
..(p)V=(-p)
..(q)V=(-q)

..(rr)V=(-rr)
r(r)=(r)
F(r)=(r)          *this rule is related to the (d)rV rule.
..(r)V=(-r)
```

```
..(s)V=(-s)
..(t)LV=(-t)
..(t)V=(-t)
..(v)V=(-v)
..(w)V=(-w)
..(x)V=(-x)
..(y)V=(-y)
..(z)V=(-z)
```

APPENDIX B
* Table of English Text-to-Sound Rules

*These rules generate an approximation of a phonetic string by
*considering the context of the characters.

```
*DCL E=(e i)
*DCL C=(b c d f g h j k l m n p q r s t v w x y z)
*DCL S=(c s x z)
*DCL T=(d t)
*DCL V=(a e i o u)

(ai)=(a)
(au)=(o)

(b)b=()

(ch)=(ch)
(c)k=()
x(c)E=()
(c)ial=(sh)
(c)E=(s)
(c)y=(s)
(cc)E=(ks)
(c)c=()
(c)=(k)

(d)d=()

(ea)=(e)
(ee)=(ee)
(eu)=(u)
(ew)=(u)
* determination of silent "e"
g(e)_=()
(e)y_=()
VC(e)_=()
VCC(e)_=()          * "lapse"
VT(e)d_=(e)         * "credited"
VC(e)d_=()
VCT(e)d_=(e)        * "conducted," "amended"
VCC(e)d_=()
VC(e)ly_=()
VCC(e)ly_=()        * "inversely"
VS(e)s_=(e)         * -es preceded by sibilant
Vg(e)s_=(e)         * -es preceded "g," "packages"
VC(e)s_=()
```

(f) f=()

(g) g=()
(ght)_=(t)
(ght)._=(t)
_(gn)=(n)
¯(gn)-=(n)

(h) h=()

(ie)=(i)

(j) j=()

_(kn)=(n)
¯(k) k=()

(l) l=()

C(le)_=(el)          * inversion of sound e.g., "circle," "idle"
C(le)d̄_=(el)         * inversion e.g., "stapled"
C(le)s_=(el)

(m) m=()
-(mn)=(n)

(n) n=()

(oo)=(u)
(ou)=(ou)
(ow)=(ou)

(p) p=()
(ph)=(f)
_(pn)=(n)
¯(ps)=(s)
¯(pt)=(t)

(q)=(k)

(r) r=()

t(re)_=(er)          * inversion of sound e.g., "theatre"
t(re)s_=(er)

(sh)=(sh)
(s) s=()
(s)ion=(sh)          * "decision," "professional"

s(t)ion=(t)          * e.g., question
(t)ion=(sh)          *      nation, premonition
(t) t=()

(v) v=()

(wh)=(wh)

```
_(wr) = (r)
 (w) = (u)

(x) x = ()
(x) = (ks)

(y) y = ()
(y) = (i)

(z) z = ()
(z) = (s)
```

The computer method invention disclosed herein can be executed on any conventional data processor. A suitable processing system is disclosed in the U.S. Pat. No. 4,731,735 entitled "Multilingual Processing for Screen Image Build and Command Decode in a Word Processor, With Full Command, Message and Help Support," by K. W. Borgendale, et al., assigned to IBM Corporation. The figures and specification of the Borgendale, et al. patent are incorporated herein by reference, as an example of a data processing system within which the subject invention herein can be applied.

Although a specific embodiment of the invention has been disclosed, it will be understood by those having skill in the art that changes can be made to the specific embodiment without departing from the spirit and the scope of the invention.

What is claimed is:

1. A process for executing transformation rules within a computer system with an input and an output which sequentially, for each input character, comprises the steps of:
    looking up the current input character in an index which identifies the rules applicable to that character;
    attempting to match a portion of the rule identified as the "body" of the rule having a string of one or more characters against the input string, starting at the current input character;
    attempting to match a portion of the rule identified as the "right context" of the rule having a sequence of strings or identifiers representing sets of strings against the input string to the right of said matching "body;"
    attempting to match a portion of the rule identified as the "left context" of the rule having a sequence of strings or identifiers representing sets of strings against the input string to the left of said matching "body;"
    outputting a replacement string associated with the matching rule when all portions of the rule match against the input string, and skipping the portion of the input string corresponding to the body to continue the transformation process;
    outputting the input character in the event that the current input character does not have any applicable rules, to continue the transformation process.

2. The process of claim 1, where the output of the transformation is reprocessed through a set of rules for any finite number of iterations.

3. The process of claim 1, where a state is associated with each rule and with each replacement string so that only rules with a particular state are examined, and the state associated with the replacement string determines the rules that will be examined in subsequent iterations.

4. The process of claim 1, where said transformation rules are hyphenation rules.

5. The process of claim 1, where said transformation rules are phonetic mapping rules.

6. A computer method for defining a collection of rewrite rules, comprising:
    inputting to a computer the body of each rule to consist of terminal strings only;
    organizing the rules based in the computer on the collating sequence of the "body" of each rule; and
    inputting to the computer an index based on the "body" of the rules to access the collection of rules.

7. A computer method for applying rewrite rules, comprising the steps of:
    scanning an input string character-by-character;
    locating rewrite rules that may be applicable by the use of an index based on the characters of the "body" of the rules;
    if the "body" and the context of a rule match, creating an input string by replacing the portion of the input string that matches the "body" of a rule with the corresponding replacement string, skipping the replaced portion of the input, and optionally setting a state variable to a value associated with the rule.

8. The method as described in claim 7, wherein the process applies to rules for which the state variable matches the execution state associated with a rule.

* * * * *